United States Patent [19]

Dischert et al.

[11] Patent Number: 4,580,173

[45] Date of Patent: Apr. 1, 1986

[54] TRANSMISSION SYSTEM WITH SEQUENTIAL TIME-COMPRESSED BASEBAND COLOR

[75] Inventors: Robert A. Dischert, Burlington; Robert E. Flory, Princeton, both of N.J.

[73] Assignee: RCA Corporation, Princeton, N.J.

[21] Appl. No.: 322,172

[22] Filed: Nov. 17, 1981

Related U.S. Application Data

[62] Division of Ser. No. 124,107, Feb. 25, 1980, Pat. No. 4,376,957.

[51] Int. Cl.$^4$ .................. H04N 9/491; H04N 9/32
[52] U.S. Cl. ............................ 358/310; 358/12; 358/328
[58] Field of Search ............... 358/12, 21 R, 133, 310, 358/320, 334, 328, 11, 14, 15, 16, 330; 360/9, 9.1

[56] References Cited

U.S. PATENT DOCUMENTS

| | | | |
|---|---|---|---|
| 2,892,017 | 6/1959 | Houghton | 358/334 X |
| 3,234,323 | 2/1966 | Kihara | |
| 3,560,635 | 2/1971 | Bruch | 358/334 |
| 3,943,558 | 3/1976 | Izura et al. | |
| 4,074,307 | 2/1978 | Dischert et al. | 358/326 X |
| 4,127,865 | 11/1978 | Poetsch | 358/12 |
| 4,133,009 | 1/1979 | Kittler et al. | 358/320 X |
| 4,210,927 | 7/1980 | Yumde et al. | 358/133 X |
| 4,245,235 | 6/1977 | Poetsch | 358/14 |

FOREIGN PATENT DOCUMENTS

| | | |
|---|---|---|
| 1274164 | 12/1966 | Fed. Rep. of Germany. |
| 2156201 | 5/1972 | Fed. Rep. of Germany. |
| 2056684 | 11/1972 | Fed. Rep. of Germany. |
| 2345973 | 9/1973 | Fed. Rep. of Germany. |
| 1437306 | 1/1976 | Fed. Rep. of Germany. |
| 2348291 | 4/1976 | Fed. Rep. of Germany. |
| 2629706 | 1/1978 | Fed. Rep. of Germany. |
| 2115443 | 7/1972 | France. |
| 49-49536 | 5/1974 | Japan. |
| 50-13127 | 4/1975 | Japan. |
| 51-105727 | 9/1976 | Japan. |
| 52-51819 | 4/1977 | Japan. |
| 1168077 | 10/1969 | United Kingdom. |
| 1373943 | 11/1974 | United Kingdom. |
| 1390877 | 4/1975 | United Kingdom. |

OTHER PUBLICATIONS

"Time-Compression-Multiplex Transmission" by J. E. Flood and D. I. Urguhart-Pullen, Proc. IEE, vol. III, No. 4, Apr., 1964, pp. 647-668.

German Article "Experimententelle Studie für ein Farbbildtelefonsystem" (An Experimental Study for a Color Video Telephone System) by G. Brand, appearing in Fernseh-und Kino-Technik, 29 Jahrgang, Nr. 1/1975.

"Simplified Time-Dovision Color Signal Multiplexing for Video Disc and VTR by using a New Solid State Memory", Nakamura et al., IEEE Transactions on Consumer Electronics, vol. CE-22, No. 1, pp. 54-60, Feb. 1976.

*Primary Examiner*—Donald McElheny, Jr.
*Attorney, Agent, or Firm*—Eugene M. Whitacre; Paul J. Rasmussen; Peter M. Emanuel

[57] ABSTRACT

An improved transmission arrangement for a color television signal includes a time-division multiplexing apparatus for alternately presenting for transmission through a single channel baseband signals defining the chrominance information of the television signal. In order to provide improved resolution, a store is coupled to the signal source for storing at a writing rate a first of the baseband components during the time at which it is generated. A read generator is coupled to the store for reading the stored baseband component at a higher data rate than that at which it was generated. The baseband component is transmitted through the single channel at the higher data rate.

20 Claims, 17 Drawing Figures

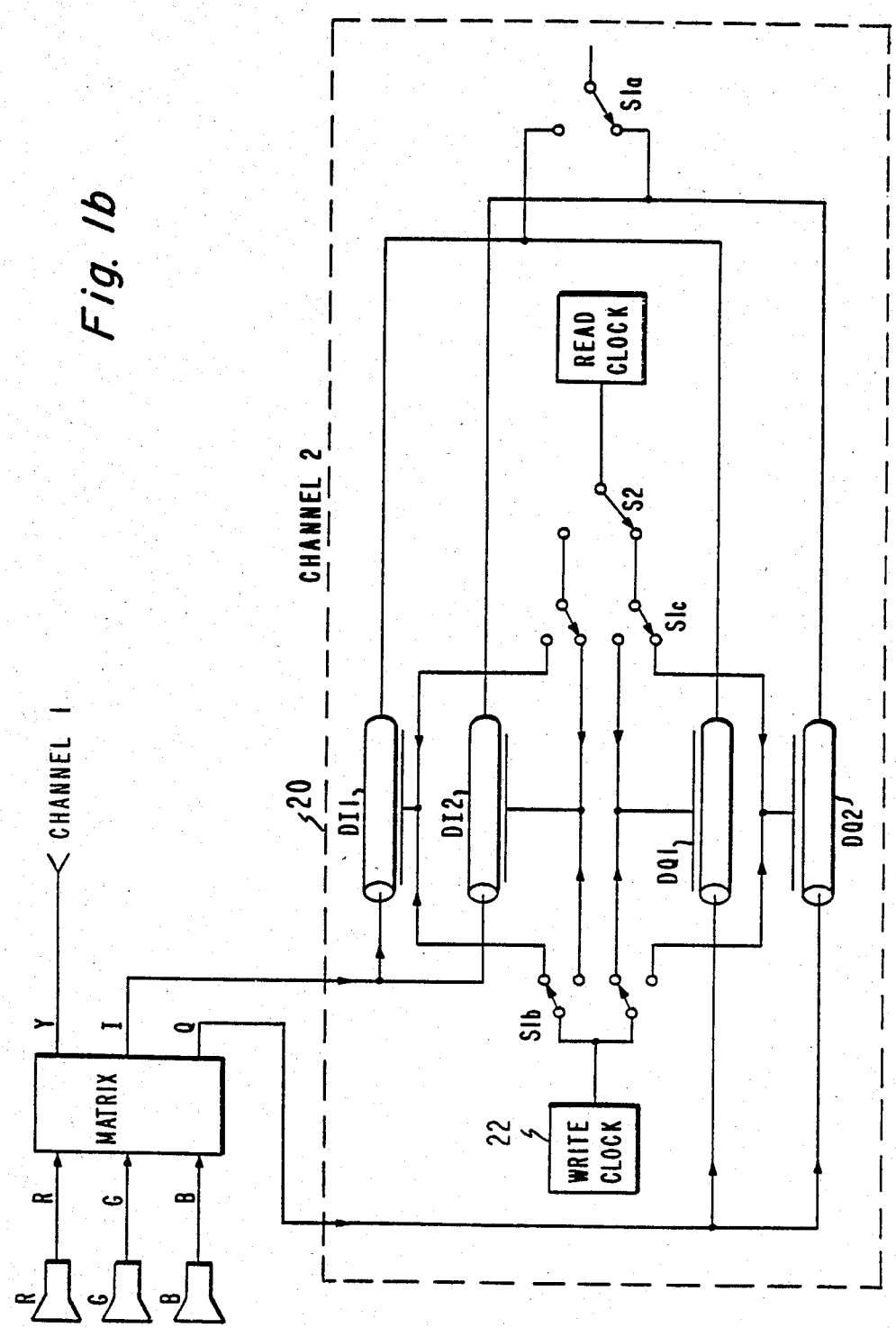

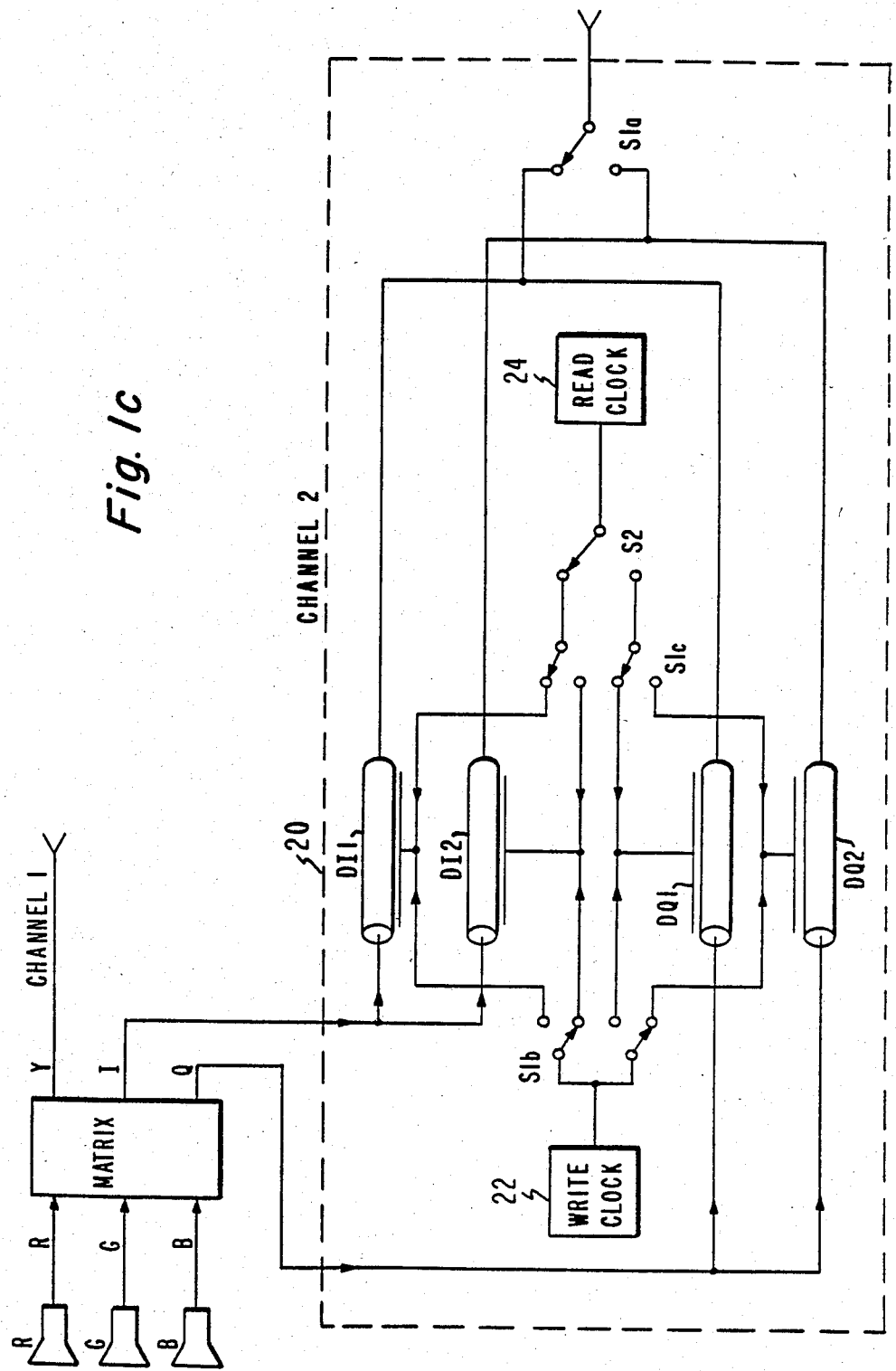

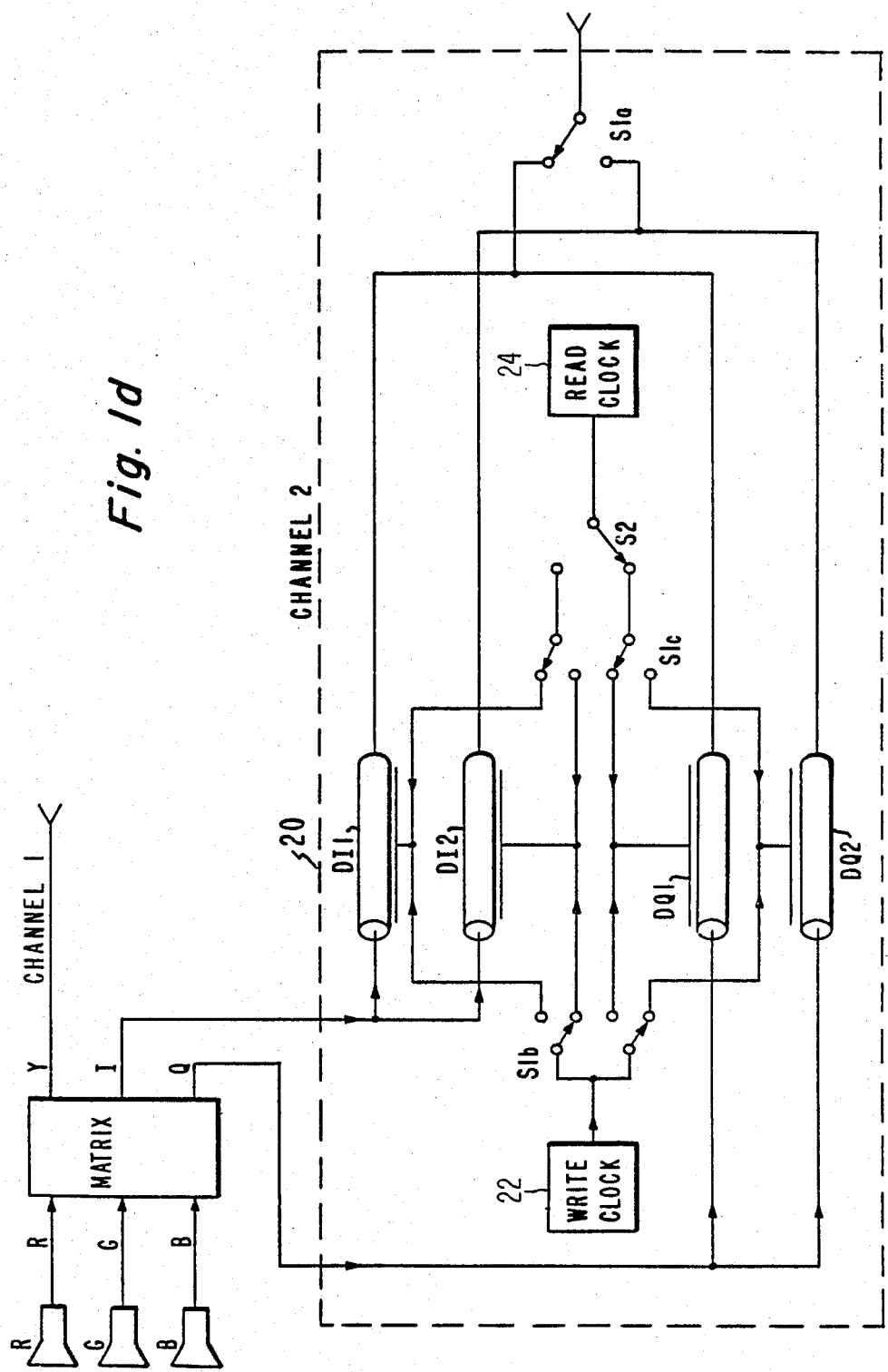

TRANSMISSION SYSTEM WITH SEQUENTIAL TIME-COMPRESSED BASEBAND COLOR

This is a divison of application Ser. No. 124,107 filed Feb. 25, 1980.

BACKGROUND OF THE INVENTION

This invention relates to a transmission system for color television signals having improved signal-to-noise (SN). In magnetic recording of television signals by video tape recorders, the record or playback head may occasionally fail to come into contact with the magnetic oxide coating because of variations in tape tension, build up of dirt on the heads and the like. This may cause a reduction in the amplitude of the signal transduced from the tape to the playback head, and may result in objectionable distortion. It is known to frequency-modulate a carrier with the video information to be recorded. Such frequency modulation of the signal translates amplitude changes of the video signal into frequency changes of the carrier. An amplitude limiter coupled to receive the frequency-modulated signal strips away amplitude variations resulting from imperfect head contact, and the frequency-modulated signal when demodulated has an improved signal-to-noise compared with the case of direct recording.

When color television signals encoded in a standard NTSC manner including luminance components and chrominance components quadrature-modulated onto a color subcarrier are recorded, the total frequency bandwidth of the vieo signal is large. When it is desired to record such an NTSC signal, it is found that that total bandwidth of the NTSC signal is so large that the sidebands of the frequency-modulated carrier extend over a greater frequency band than can be encompassed within the FM channel of the recorder. Consequently, the "color under" system has been used in the past. In this system, the color subcarrier, quadrature modulated with chroma components, is directly recorded at a low frequency on the same tape track with an FM carrier modulated by video luminance information. To improve linearity, the directly recorded chrominance information is recorded with the aid of a bias signal. To prevent interaction between the bias signal and the frequency-modulated carrier, the FM carrier is often used as the bias signal. While such an arrangement allows recording of a color television signal on a single track of a video tape recorder, certain problems exist, such as poor SN of the chrominance signal, crosstalk between the two quadrature-modulated color signals, and limited freuency bandwidth which necessitates reduction of the desired bandwidth in either the chrominance or luminance information, or possibly both. Furthermore, the FM luminance carrier cannot be modulated to the maximum possible amount because maximum modulation drives the recording medium into saturation, adding distortion to the directly recorded chrominance information.

In order to improve the quality of the television signal to broadcast standards, the luminance information may be recorded on a first track of the tape by the use of a frequency-modulated carrier, while at the same time recording the quadrature-modulated chrominance information onto a second track of the tape adjacent the first. The chrominance information is modulated onto a frequency-modulated carrier for improved signal-to-noise. It has been found, however, that broadcast quality may not be achieved even in such a system using two wideband channels for the recording of the video information. Furthermore, it has been found that cross-modulation occurs between the two components of the chrominance signal.

FIG. 8 illustrates an amplitude-frequency diagram. In FIG. 8, a frequency F0 illustates the rest frequency of a frequency-modulated carrier. FLO and FHI represent the lower and upper deviation frequency limits, respectively. An envelope 810 illustrates the amplitude-frequency characteristic of a transmission channel generally including, for example, a tape recorder channel. At frequencies F14 and F16 the response of the channel is reduced due to filters, inherent frequency limitations and the like. A series of spectral lines 812 illustrates generally the distribution of energy which results from modulating the carrier with a relatively low-frequency video signal. Many spectral lines appear, the amplitude of which depends upon the amplitude of the modulating signal. FIG. 9 illustrates the response of the same system modulated with a relatively high-frequency video signal. Very few spectral lines 822 appear within the passband defined by curve 810. Other spectral lines illustrated as 824 are cut off and do not appear. It has been established that the signal-to-noise ratio of a frequency-modulated transmission channel such as that described is degraded at higher modulating frequencies. This may be explained by the loss of many of the spectral lines associated with the information of the signal in the case of the high-frequency signal, as compared with the low-frequency situation in which large numbers of spectral lines are carried through the channel.

In order to obtain improved characteristics for a two-channel tape recorder or other transmission system, it is desirable to reduce the frequency of the signal modulating the chrominance channel. Comprison of the bandwidth of the baseband I and Q signals of FIGS. 3a and 3b with the bandwidth of the I and Q signals quadrature-modulated onto a subcarrier, as illustrated in FIG. 3f, reveals that each of the baseband signals alone has a lesser bandwidth than does the modulated signal. The frequency bandwidth of the signal modulating the chrominance channel may be reduced by alternately modulating the frequency-modulated carrier in the chrominance signal channel with one of the two chrominance signals representing the chrominance information. For example, if the chrominance information is represented by I and Q signals, where the I signal has a frequency bandwidth of 1 MHz and the Q signal has a frequency bandwidth of 0.5 MHz, each of these signals is alternately modulated onto the carrier for coupling into the channel. Alternation, however, results in a loss of I signals during that interval in which Q signals are being carried through the system, and similarly Q signals are lost during that interval in which I signals are being processed. Thus, there is a loss in signals similar to that which occurs in a SECAM system. In the SECAM system, the line-to-line alternation of the chrominance information results in a reduced vertical chrominance resolution which degrades the picture. U.S. Pat. No. 4,163,248 issued July 31, 1979 to Heitmann describes a system for alternately processing luminance and chrominance information through a digital field store; the loss of information is concealed by repetition of the stored chrominance information during display of unstored luminance and repetition of stored luminance information during display of unstored chrominance. A television transmission system, which may include a record, and having high signal-to-noise, low crossmodulation and high resolution (no information loss) in the chrominance channel is desirable.

SUMMARY OF THE INVENTION

An improved color television signal transmission arrangement for a color television signal, where the signal includes a plurality of baseband components which define luminance and chrominance information. The transmission arrangement includes a transmission channel and a time-division multiplexer for alternately presenting for transmission the baseband components defining the chrominance information. The time-division multiplexer switches at a rate established by the television horizontal line rate. Storage means are included in the transmission arrangement for storing at a writing rate a first of the plurality of baseband components which define at least a portion of the chrominance information. The storage occurs during the time at which that first baseband component is generated. A reading arrangement is coupled to the store and to the time-division multiplexer for reading from the store the first baseband component. The reading from the store of the first baseband component is at a rate different from the writing rate for providing time compression or expansion. The first baseband component read from the store is supplied to the time-division multiplexer for presentation for transmission.

DESCRIPTION OF THE DRAWING

FIGS. 1a–1d show in various operating states a transmission system including a signal processor embodying the invention;

DESCRIPTION OF THE INVENTION

Figure 1A:
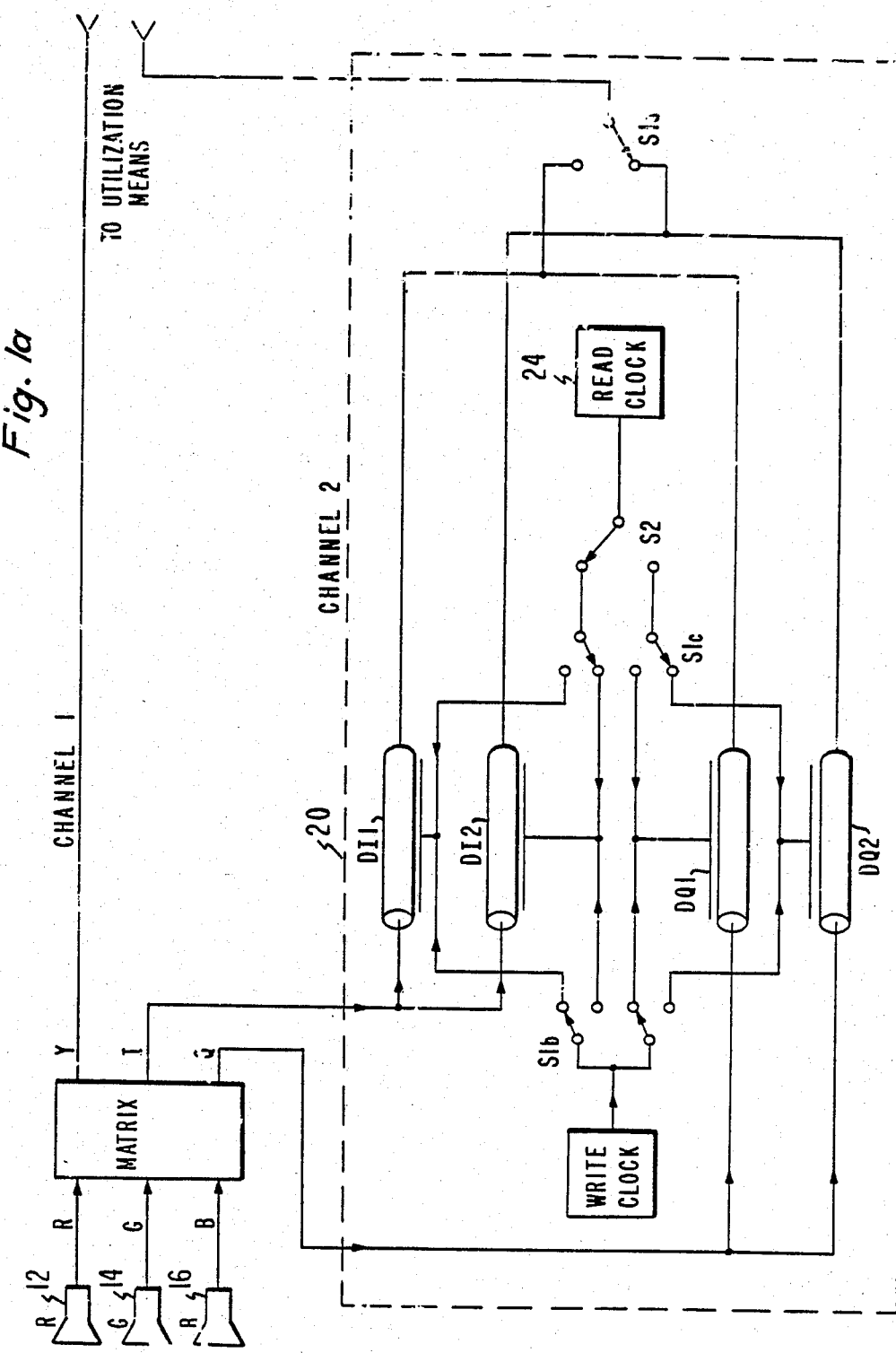

FIG. 1a illustrates a generalized transmission system to which color television signals are applied. In this instance, the television signals are generated by a matrix 10 which receives red (R), green (G) and blue (B) baseband video signals from individual video cameras 12, 14 and 16, respectively. Matrix 10 processes this plurality of baseband components defining luminance and chrominance information to produce luminance (Y) information which is coupled directly by a first channel of the transmission system to a utilizing means (not shown). Matrix 10 also forms further baseband components conventionally known as I and Q signals representative of the chrominance information being processed, and couples them to a signal processor 20 of a second channel of the transmission system. The I signals are coupled in parallel to the inputs of clocked delay lines DI1 and DI2 of processor 20 for further processing, and the Q signals are coupled in parallel to the inputs of further clocked delay lines DQ1 and DQ2. (Delay lines are designated generally by the letter D, those processing I information are also designated by the letter I, those processing Q information by the letter Q.) The outputs of delay lines DI1 and DQ1 are coupled in parallel, and the outputs of delay lines DI2 and DQ2 are coupled in parallel. A single-pole, double-throw switch S1A switches alternately between the parallel outputs of the delay lines for selecting the output signal of processing portion 20 of the transmission channel. The remainder of processing portion 20 of the second transmission channel is a clocking arrangement by which sequential processing of the I and Q signals in the delay lines is accomplished without loss of information and the consequent loss of resolution.

A write clock generator 22 is coupled by a doublepole, double-throw switch S1B to pairs of delay lines DI, DQ for clocking the delay lines to cause signals to be coupled therethrough. For example, at the time illustrated in FIG. 1, switch S1B couples the write clock signal to DI1 and DQ1. A read clock generator 24 is also coupled to delay lines DI, DQ by way of a doublepole double-throw switch S1C and a single-pole doublethrow switch S2. A switch drive means (not shown) drives switches S1A, S1B, and S1C synchronously at the horizontal rate and drives switch S2 at twice the horizontal rate. Switch S1 toggle at a time during the horizontal blanking interval and switch S2 toggles synchronously with switch S1 and also at a time near the center of each horizontal line interval.

Clocked delay lines D in the embodiment of FIG. 1 may include charge-transfer devices of the type known as charge-coupled devices (CCD) which are well known in the art. Each CCD consists of a number of cells which when clocked cause a sequential transfer from cell to cell of charge packets representing analog signals. Thus, each delay line may be considered a sampled analog delay line, the sample rate of which is determined by the clock rate and the delay of which is determined by the clock rate of the number of cells. The clocking rate of generator 22 is selected based upon the maximum frequency which may be expected in the signals being processed through the delay lines so as to provide a faithful reproduction of the signal as determined by Nyquist's criterion. For example, the minimum frequency of write clock generator 22 might be selected to be twice the maximum frequency expected to be processed through a delay line. The number of cells in each delay line D is selected to have a propagation delay of 1H, which is sufficient delay to store an I or Q signal occurring during one horizontal line. Read clock generator 24, in a particular embodiment of the invention, has its frequency selected so as to allow signal to propagate through a delay line at twice the writing rate, thereby allowing the signal representing an entire horizontal line of chrominance information to be read out of a delay line during an interval equal to one-half of a horizontal line.

Figure 2:
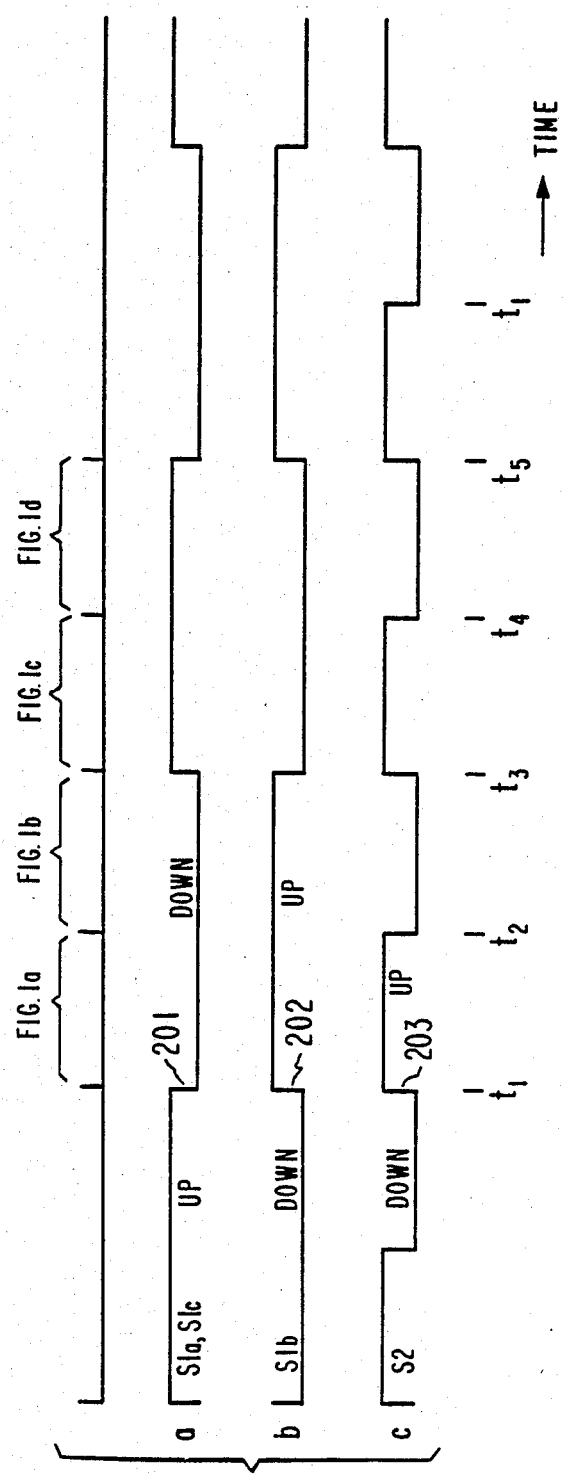
FIG. 2 illustrates a state diagram useful in understanding the operating cycle.

Prior to time T1, as illustrated in FIG. 2, DI2 and DQ2 were clocked at the write rate so as to store the entire I and Q signals, respectively, for the preceding horizontal line. Delay lines DI1 and DQ2 contain material unsuitable for transmission. At time T1, which may occur during a horizontal blanking interval or during a transition from one line to the next, the condition of switches S1 and S2 changes as shown by waveforms 201, 202 and 203 of FIGS. 2a, 2b and 2c, respectively. A high condition of any of waveforms 201–203 represents an "up" condition of the switch associated with that waveform. Thus, in the interval between time T1 and T2 of FIG. 2, switches S1A and S1C are in a "down" position as represented by a low condition of waveform 201; switch S1B is in an "up" position as represented by a high condition of waveform 202; and switch 2 is in an "up" position as represented by waveform 203. Thus, the condition of the switches of FIG. 1 in the interval T1–T2 is that condition represented in FIG. 1a. Similarly, the condition of the switches in the interval T2–T3 is that condition illustrated in FIG. 1b, and FIGS. 1c and 1d represent the condition of the switches in the intervals T3–T4 and T4–T5, respectively. The condition of the switches repeats cyclically.

In the interval preceding time T1, as mentioned, DI2 and DQ2 were clocked by write clock generator 22 so as to store in DI2 and DQ2 a sampled analog version of the I and Q signals occurring in the preceding line. DI1 and DQ1 contain unsuitable information. At time T1, the switch configuration becomes that of FIG. 1a, as indicated by FIG. 2. Write clock generator 22 becomes coupled at time T1 to DI1 and DQ1, which begin clocking at the writing rate to progressively store the I and Q signals occurring in the interval T1–T2. The unsuitable material stored therein is simultaneously clocked out, but the unsuitable material is decoupled from the output of transmission processor 20 at switch S1A and does not affect the output signal. Delay line DQ2 remains in a passive storage mode in interval T1–T2. Also in the interval T1–T2, read clock generator 24 is coupled to delay line DI2, and the I signal stored therein is clocked out at twice the rate at which it was clocked in. The signal clocked out of DI2 is coupled by switch S1A to the output of transmission processor 20. While DI2 is clocking out, the I signal at its input is also clocked into cells of delay line DI2. However, the current line I information is not coupled to the output of processor 20 because at the moment that the first of the current line information would begin to exit from DI2, switch drive signal 203 takes a transition representing the switching of S2 to produce the configuration shown in FIG. 1b.

As illustrated in FIG. 1b, write clock generator 22 continues to be coupled during interval T2–T3 to DI1 and DQ1 for loading or storing the current line I and Q information. However, no clocking signals at all are coupled to DI2, and it becomes passive and retains the stored I information from the first half T1–T2 of the first horizontal line T1–T3. Switch S1C couples read clock 24 to previously passive DQ2. DQ2 contains the Q information from the horizontal line preceding time T1. Beginning at time T2, this I signal is clocked to the output of transmission processor 20. As in the case of DI2, the clocking out of the stored information causes the storage in DI2 of Q information from the current line. However, Q information from the current line cannot begin to exit from DQ2 until after time T3. At time T3, the first horizontal line ends and the second horizontal line begins.

At time T3, the condition of the switches of FIG. 1 changes as indicated by waveforms 201–203, and in the interval T3–T4 the condition is as illustrated in FIG. 1c. In FIG. 1c DI2 and DQ2 are coupled to the write clock and their parallel outputs are decoupled from the output of processor 20. Consequently, DI2 begins to store currently generated I signal and DQ2 begins to store currently generated Q signal. The unusable half-line information stored therein during the previous line is clocked out as current signal is stored. During the interval T3–T4, DQ1 is not clocked and merely retains the stored Q information from horizontal line T1–T3. D11, however, is coupled to read clock generator 24, and begins to read out the I information stored during line T1–T3, in a manner similar to that already described. At time T4, when all of the I information relating to horizontal line T1–T3 has been read out, but before I information stored subsequent to time T3 has been read out, the switch configuration again changes to that represented by waveforms 201–203 of FIG. 2 in the interval T1–T5. This configuration is illustrated in FIG. 1d. In FIG. 1d, it will be recognized that the configuration of FIG. 1d occurring in the interval T4–T5 allows loading in DI2 and DQ2 of the I and Q signals then being generated, and allows DQ1 to be read so as to couple to the output of processor 20 the Q signal stored during interval T1–T3 of the preceding horizontal line. At time T5, then, D11 and DQ1 are loaded with information which is not useful for transmission and D12 and DQ2 are loaded with the I and Q, respectively, information from the preceding line. This will be recognized as the same condition as that which preceded time T1, and that the cycle as described can repeat.

Thus, the arrangement of FIG. 1 represents a two-channel transmission system in which the luminance information is transmitted on one channel and the chrominance information is represented by baseband I and Q signals which are generated concurrently, stored and then time compressed by a factor of 2:1 for sequential coupling to the second channel of the transmission system. This transmission system maintains high resolution and has improved signal-to-noise. It should be noted that operation of the delay line D at twice the clock rate for time compression also results in a doubling of the signal frequencies associated with the I and Q signals, and this in turn affects the minimum allowable bandwidth of channel 2 of the arrangement of FIG. 1.

Figure 3A:
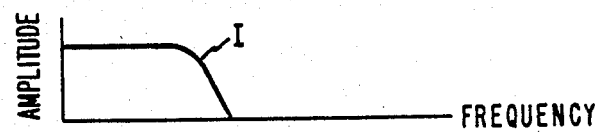
FIG. 3, including 3a—3f, illustrates bandwidths of signals and the time sequence of the signals useful in understanding certain aspects of the invention.
Figure 3B:
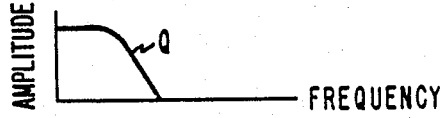
Figure 3C:
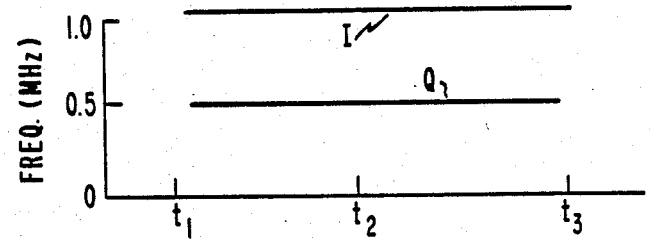
Figure 3D:
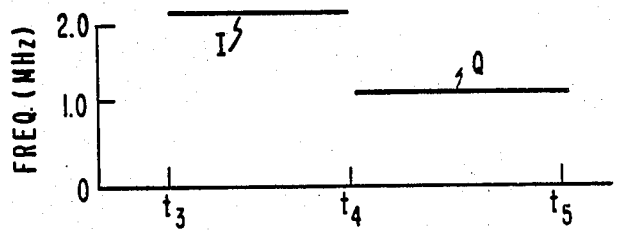
Figure 3E:
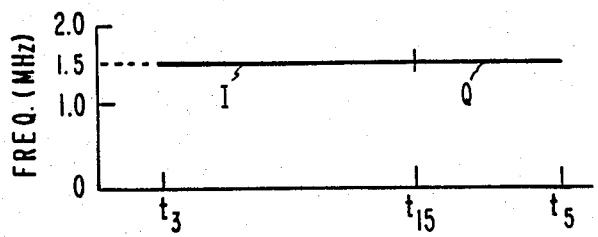
Figure 3F:
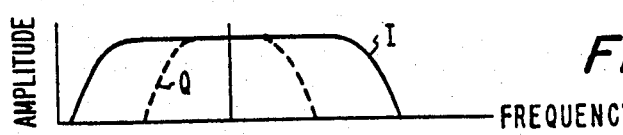

Commonly, the I chrominance signal has a greater signal bandwidth than the Q signal. This is illustrated in FIGS. 3a and 3b. Over the interval T1–T3, the bandwidth remains constant as illustrated in FIG. 3c. The I signal has a 1.0 MHz bandwidth and the Q signal has a 0.5 MHz bandwidth. FIG. 3d illustrates the result of time-compressing the I and Q signals of FIGS. 3a–3c equally for sequential presentation in the interval T3–T5. The I signal presented in the interval T3–T4 has a 2 MHz bandwidth representing the doubling of the 1 MHz bandwidth as it was generated, and the doubled frequency of the Q signal is only 1.0 MHz. Consequently, in the interval T4–T5 the bandwidth of channel 2 of the transmission system is under-utilized. By appropriate selection of the duration of the read-out interval and the read-out clock frequency, the bandwidth of the time-compressed I and Q signals can be made equal, as illustrated in FIG. 3e. If the interval T3–T15 during which the I signal is read-out is two-thirds of the available read-out time and the time interval T15–T5 in which the Q signal is read out is one-third the available time, the bandwidth of the I signal as generated is multiplied by 3/2 to 1.5 MHz as illustrated in FIG. 3e and the Q signal is multiplied by 3. With such an apportionment of the compression based on the signal bandwidth, the channel bandwidth use is maximized.

Figure 4:
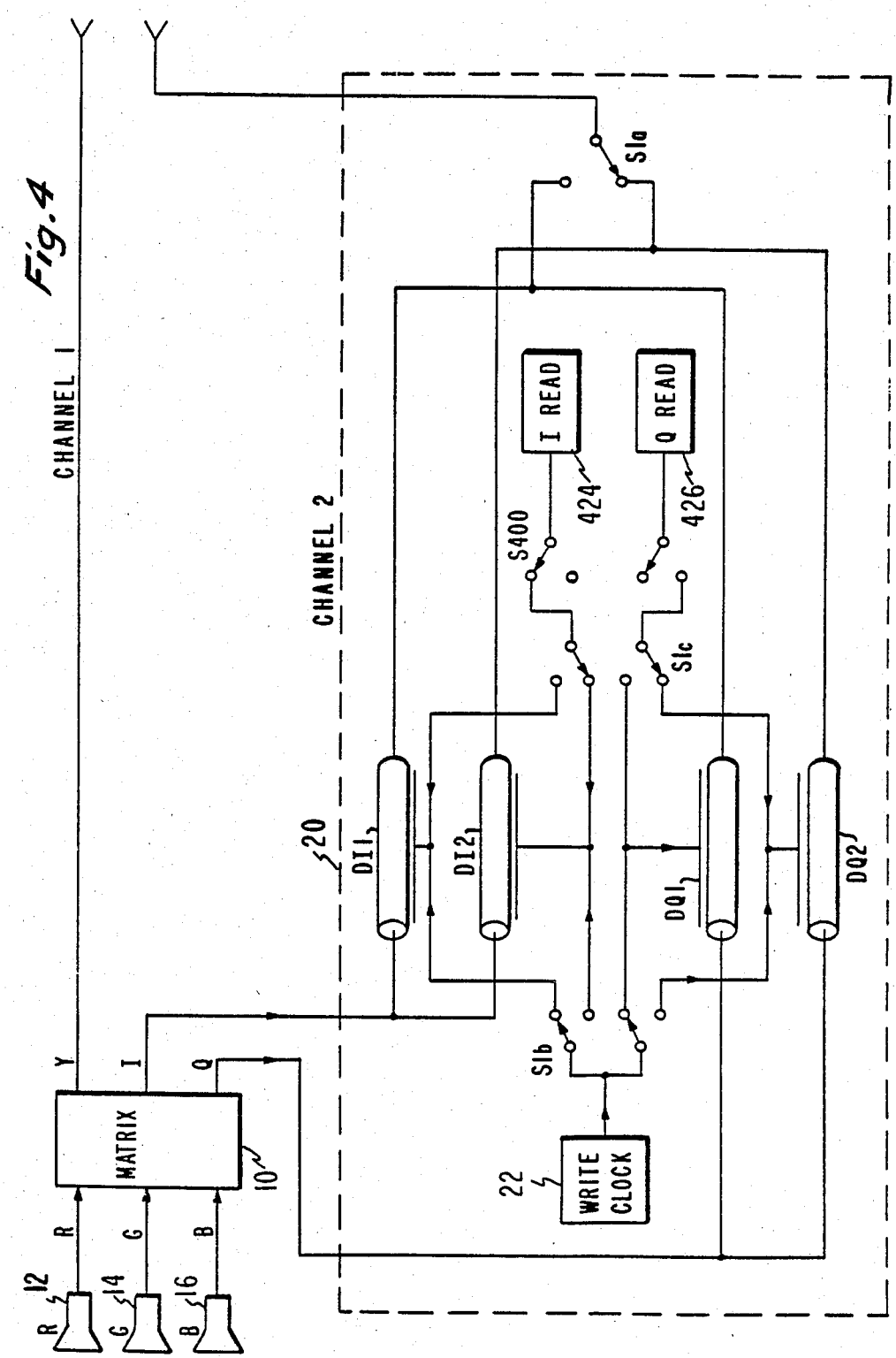
FIG. 4 is a diagram in block and schematic form of a two-channel transmission system embodying the invention and having certain bandwidth advantages.

FIG. 4 illustrates an arrangement by which the I and Q signal is sequentially presented for transmission may have the same bandwidth. In FIG. 4, elements corresponding to those of FIG. 1 are provided with the same reference numerals. Reference to FIG. 2 and to the description of the operation of FIG. 1 will reveal that when waveform 203 is high representing an up condition for switch 2, I is being read, and when S2 and waveform 203 are down, Q is being read. Consequently, a double-pole double-throw (DPDT) switch S400 may be substituted for SPDP switch S2 of FIG. 1a. A first half of switch S400 connected as shown in FIG. 4 is connected to an I read clock generator 424 and a second pole is connected to a Q read clock generator 426. Generators 424 and 426 are at different frequencies. The I read clock is selected to read-out I information from delay lines DI in ⅔ of a horizontal line and Q read clock generator 426 has a frequency selected to read Q information from the DQ delay lines in ⅓ of a line. Thus, in the example given (I bandwidth as generated of 1 MHz and 0.5 MHz for Q and with ⅔ of the transmission time devoted to I and ⅓ to Q), the I read clock would be at a frequency or rate of 1.5 times that of the write clock, while the Q read generator would be at a rate of 3 times the write clock rate.

The descriptions of the embodiments of FIGS. 1 and 4 are somewhat simplified in that it has been assumed that chrominance information is generated during the horizontal blanking interval. Generally speaking, this is not the case. Thus, the switching of switches S1, S2 and S400 may include a condition in which the delay lines D are not clocked at all, so as to avoid entering or coupling out information during the horizontal blanking interval. Also, it will be obvious to those skilled in the art that signals stored during the active portion of each horizontal line may be read-out during the interval including the blanking interval, thereby allowing a reduction in the bandwidth required for transmission of the sequential I and Q signals by the ratio of the active video time (approximately 53 microseconds) in each horizontal interval to the total horizontal interval (63.5 microseconds).

If the direction of the delay time D of the transmission processors 20 of FIGS. 1 and 4 are reversed so that the signals proceed from right to left rather than from left to right, the encoders may be operated in reverse mode as decoders of the sequentially coded signals. Thus, for example, the I and Q signals sequentially encoded with equal times as described in conjunction with FIG. 1 may be applied to the common terminal of switch S1A for sequentially writing into a DI and DQ delay line. Clock generator 22 clocks the information out in parallel to produce concurrent I and Q signals from the sequentially stored information.

It will be apparent that R-Y and B-Y chrominance signals representing chrominance information may be processed rather than I and Q signals by an arrangement such as that shown in FIG. 1a. However, because the R-Y and B-Y signals ordinarily have equal bandwidths, the arrangement of FIG. 4 would not be used unless unequal output bandwidths were desired.

Figure 5:
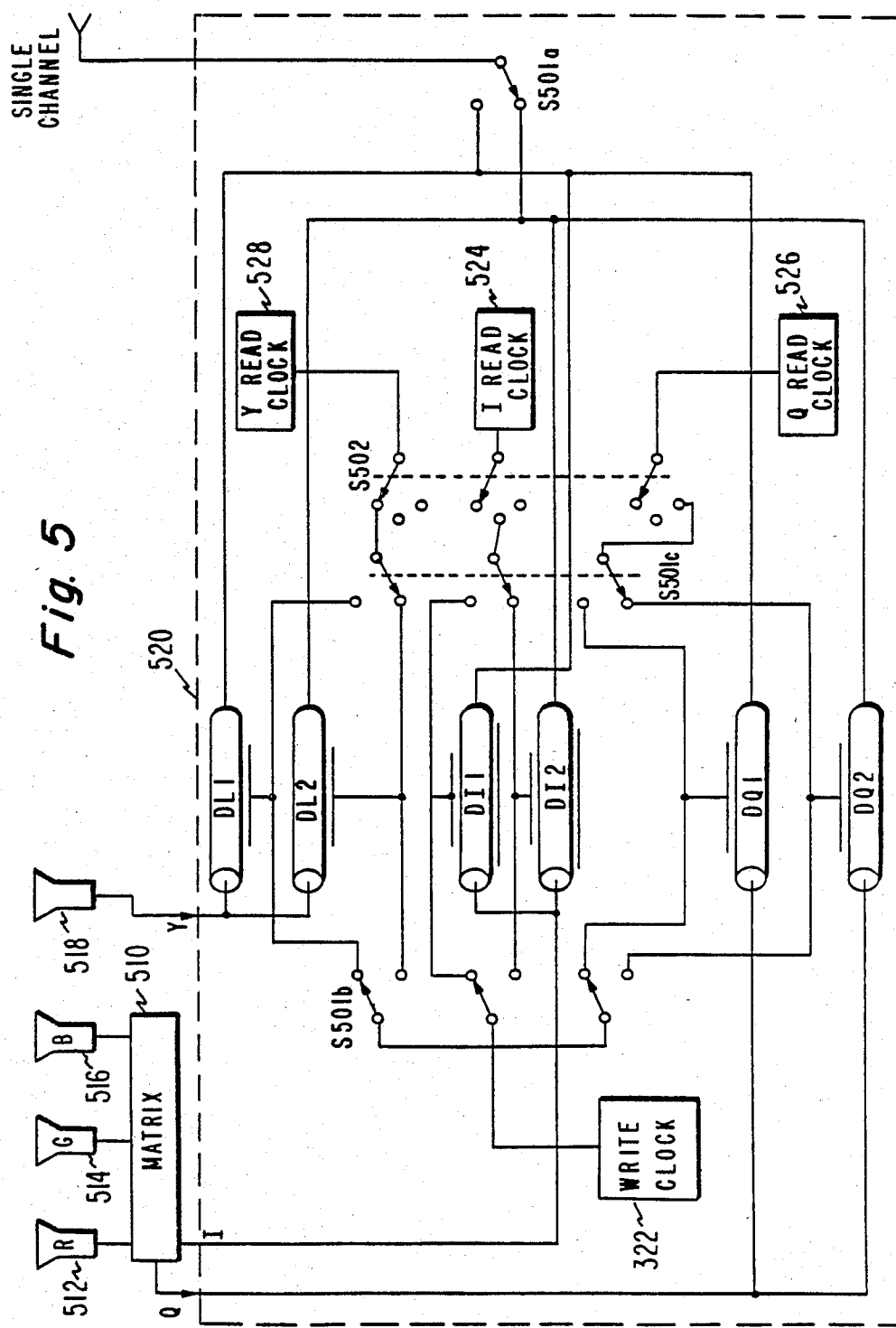
FIG. 5 is a diagram in block and schematic form of a single-channel transmission system embodying the invention.

FIG. 5 illustrates a transmission arrangement in which luminance and chrominance information are sequentially coupled to a transmission system. In FIG. 5, elements corresponding to those in FIGS. 1 and 4 are provided with corresponding reference numerals in the 500 series. Three separate read clock generators 524, 526 and 528 are provided for reading out the I, Q and Y components at different rates so as to provide equal bandwidth. If it is assumed that the normal bandwidth of the Y signal is 4 MHz, the normal I bandwidth is 1 MHz and the normal Q bandwidth is 0.5 MHz, and if transmission time during each horizontal line interval is apportioned eight parts to the luminance, two parts to I and one part to Q, then the bandwidth of the luminance increases to 11/8 times 4 MHz, which is 5.5 MHz. The corresponding I frequency is found by multiplying 1 MHz by 11/2 which yields 5.5 MHz. Similarly, the Q frequency as compressed is 11×0.5 or 5.5 MHz. Consequently, the total bandwidth of the channel remains at 5.5 MHz throughout the transmission interval and couples the entirety of the color television signal, without loss, with a total bandwidth of 5.5 MHz. Thus, a 5.5 MHz bandwidth channel can carry the entire luminance and chrominance information without degradation of resolution. This is less than the bandwidth that would be required to transmit the luminance plus quadrature-modulated chrominance information, and yet it provides better signal-to-noise performance.

Figure 6:
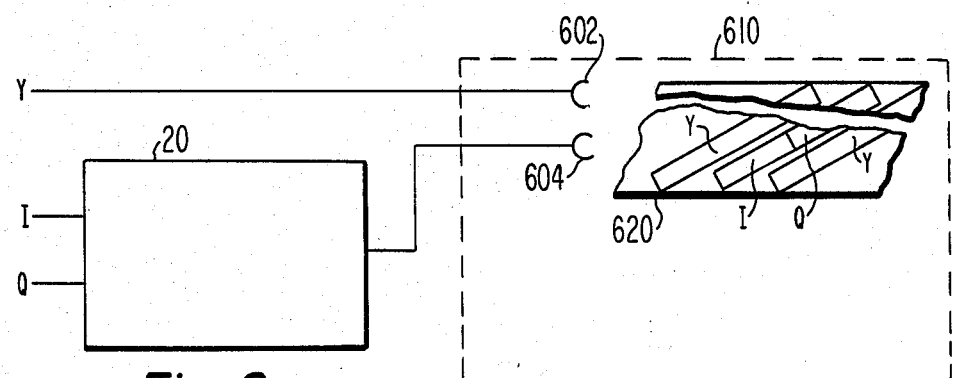
FIG. 6 illustrates a two-channel transmission system including a tape record according to the invention.
Figure 7:
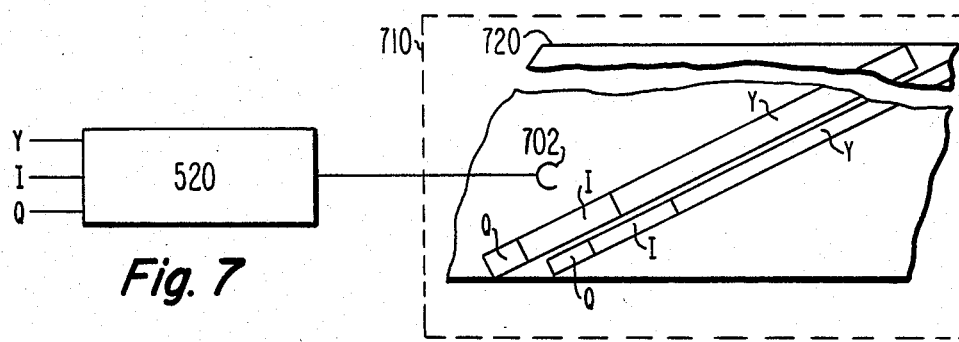
FIG. 7 illustrates a one-channel transmission system including a tape record according to the invention.
Figure 8:
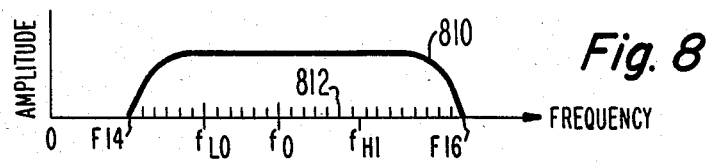
FIGS. 8 and 9 illustrate amplitude-frequency diagrams and spectra useful in understanding the advantages of the invention.
Figure 9:
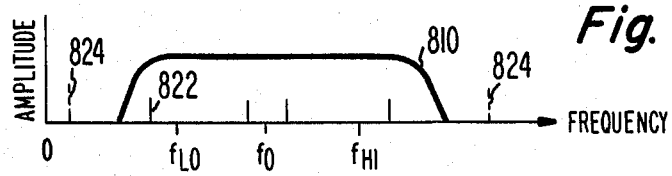

FIG. 6 illustrates a 2-channel transmission system in which a first channel carries a luminance signal and which a second channel receives I and Q signals which are processed by a signal processor 20 for sequential coupling of the I and Q signals to a second channel of the system. The first and second channels of the transmission system are coupled to first and second recording heads 602 and 604 in a video tape recorder 610. As illustrated in FIG. 6, a tape 620 has scanned thereon in parallel tracks the Y information and the sequential I and Q information. Of course, the I and Q information may be presented in either sequence. In FIG. 7, a transmission arrangement includes television signals coupled to a signal processor 520 for sequentially coupling luminance and chrominance information onto a single transmission channel. The single transmission channel is coupled to a single recording head assembly 702 in a tape recorder 710. As illustrated in FIG. 7, head 702 scans sequential tracks on a tape 720. Each track contains time-sequential luminance and chrominance information. The information may be in any order, and the form of the information is not restricted to Y, I and Q. For example, the baseband information defining the luminance and chrominance information may be R, G and B information having equal bandwidth, or, as often occurs, having a G component with greater bandwidth than the R and B bandwidth.

It will be obvious to those skilled in the art that the physical switches described for ease of understanding the invention may instead be solid-state equivalents such as those well-known in the art. Also, any signal source for producing baseband chrominance and luminance information may be used instead of the matrix shown. Instead of CCD delay lines D as illustrated in the embodiments shown, digital memories may be used.

As a further advantage of the described transmission system, the signal is scrambled by comparison with NTSC coded signals and cannot be received by an ordinary receiver. At the current state of the art, the CCD delay lines are expensive and this provides a measure of security from someone who might casually wish to develop a decoder. Thus, the described transmission channel may include a satellite transponding system used for restricted channels.

What is claimed is:

1. An improved color television signal transmission arrangement for a color television signal including a plurality of baseband components, each of which baseband components is generated concurrently during the active part of each of a plurality of successive horizontal line intervals, said plurality of baseband components defining luminance and chrominance information, said arrangement including time-division multiplexing means for sequentially presenting for transmission said baseband components defining said chrominance information, said time-division multiplexing means switching at a rate established by the television horizontal line rate; wherein the improvement lies in that said time-division multiplexing means further comprises:

a first pair of line storage means for storing at a writing rate the same first one of said chrominance-representative baseband components of each pair of said horizontal line intervals;

a second pair of line storage means for storing at said writing rate the same second one of said chrominance-representative baseband components of each pair of said horizontal line intervals; and control means coupled to said storage means for, during each one of said horizontal line intervals, causing said first chrominance-representative baseband component to be read from one of said first pair of storage means in which it was stored during the previous one of said horizontal line intervals at a reading rate greater than said writing rate and for supplying the thus time-compressed first baseband component for presentation for transmission during a first portion of the active part of said horizontal line interval and causing said second chrominance-representative baseband component to be read from one of said second pair of storage means in which it was stored during said previous one of said horizontal line intervals at a reading rate greater than said writing rate and for supplying the thus time-compressed second baseband component for presentation for transmission during a second portion of the active part of said horizontal line.

2. An arrangement according to claim 1 wherein said time-division multiplexing means switches at twice said television horizontal line rate.

3. A channel for coupling first and second color-representative television signal components supplied by first and second signal sources, respectively, said first and second signal components both occurring concurrently during each of successive scanning line intervals interspersed with successive line synchronization intervals, to a channel output, comprising:

first and second pairs of storage means for storing said first and second signal components, respectively, of each pair of said line intervals;

clock means for generating writing and reading clock signals which define respective lower and higher rates at which said storage means write in and read out said first and second signal components; and control means coupled to said clock means and said storage means, for during each line interval, selectively coupling said writing and reading clock signals to different ones of said storage means of said first and second pairs of storage means to cause (1) said first and second signal components of the same line interval to be concurrently written into respective ones of said storage means of said first and second pairs of storage means; and (2) said first and second signal components stored in the other respective ones of said storage means of said first and second pairs of storage means during a previous line interval to be sequentially read out of said other respective ones of said storage means of said first and second pairs of storage means and to be sequentially coupled to said channel output.

4. Apparatus according to claim 3, wherein:

each of said storage means of said first pair of storage means has an input continuously coupled to said first source and also has an output;

each of said storage means of said second pair of storage means has an input continuously coupled to said second source and also has an output; and switch means is coupled between said channel output and said outputs of said storage means and is responsive to said control means for, during each of said line intervals, selectively coupling said channel outputs to the output of the one of said storage means being read out and decoupling said channel output from the output of the one of said storage means being written into.

5. A television signal processing apparatus for processing first and second color-difference television signal components supplied by first and second signal sources, respectively, said first and second signal components both occurring concurrently during each of successive scanning line intervals, comprising:

an output of said signal processing apparatus;

first and second storage means each having an input coupled to said first source for, in combination, storing said first signal component of each of said line intervals, each of said first and second storage means also having an output coupled to said output of said signal processing apparatus;

third and fourth storage means each having an input coupled to said second source for, in combinaton, storing said second signal component of each of said line intervals, each of said third and fourth storage means also having an output coupled to said output of said signal processing apparatus;

clock means coupled to said first, second, third and fourth storage means for controlling the rates at which said first and second storage means write in and read out said first signal component, and for controlling the rates at which said third and fourth storage means write in and read out said second signal component; and control means coupled to said clock means and to said first, second third and fourth storage means for repetitively causing, in groups of two-line intervals including first and second line inervals, (1) said first and second signal components to be concurrently written into said first and third storage means, respectively, at a first rate during said first line interval of each of said two-line interval groups; (2) said first and second signal components previously written into said second and fourth storage means, respectively, to be sequentially read out of said second and fourth storage means at respective second rates greater than said first rate and to be sequentially coupled to said output of said signal processing apparatus during said first line interval of each of said two-line interval groups; (3) said first and second signal components to be concurrently written into said second and fourth storage means, respectively, at said first rate during said second line interval of each of said two-line interval groups; and (4) said first and second signal components previously written into said first and third storage means, respectively, to be sequentially read out of said first and third storage means, respectively, at said respective second rates and to be sequentially coupled to said output of said signal processing apparatus during said second line interval of each of said two-line interval groups.

6. Apparatus according to claim 5, further including:
switch means coupled between said output of said signal processing apparatus and said outputs of said first, second, third and fourth storage means and responsive to said control means for, during each of said line intervals, selectively coupling said output of said signal processing apparatus to the output of the one of said storage means being read out and decoupling said output of said signal processing apparatus from the output of said storage means being written into.

7. Apparatus according to claim 5 wherein:
said second rate at which said first signal component is read from said first and second storage means substantially equals said second rate at which said second signal component is read from said third and fourth storage means.

8. Apparatus according to claim 7 wherein:
said second rates are each twice said first rate.

9. Apparatus according to claim 8 wherein:
said first and second color-representative signal components are R-Y and B-Y, respectively.

10. Apparatus according to claim 5 wherein:
the ratio of said second rate at which said first signal component is read from said first and second storage means to said first rate is different from the ratio of said second rate at which said second signal component is read from said third and fourth storage means to said first rate, and the different ratios are selected to equalize the bandwidths of said first and second signal components read from said storage means.

11. Apparatus according to claim 10 wherein:
said first and second color-representative signal components are I and Q, respectively.

12. Apparatus according to claim 5 further comprising:
a third signal source for supplying a luminance-representative third signal component occurring concurrently with said first and second color-representative during each of said successive line intervals;
a further output of said signal processing apparatus; and
luminance coupling means for coupling said third signal component to said further output of said signal processing apparatus.

13. Apparatus according to claim 12 further comprising:
first transducer means coupled to said first-mentioned output of said signal processing apparatus for recording information onto a first channel of a magnetic tape in accordance with the signal developed at said first output; and
second transducing means coupled to said further output of said signal processing apparatus for recording information onto a second channel of said magnetic-tape, separate from said first channel, in accordance with the signal developed at said further output.

14. Apparatus according to claim 5, further comprising:
a third signal source for supplying a luminance-representative third signal component occurring concurrently with said first and second signal color-or-representative components during each of said successive line intervals;
fifth and sixth storage means each having an input coupled to said third source for storing, in combination, said third signal component of each of said line intervals, each of said fifth and sixth storage means also having an output coupled to said output of said signal processing apparatus; and wherein
said clock means is also coupled to said fifth and sixth storage means for controlling the rates at which said fifth and sixth storage means write in and read out said third signal component;
said control means is also coupled to said fifth and sixth storage means for repetitively causing, in said groups of two line intervals, (1) said third signal component to be written into said fifth storage means at said first rate during said first line interval of each of said two-line interval groups; (2) said third signal component previously written into said sixth storage means to be read out of said sixth storage means at a third rate greater than said first rate and to be coupled to said output of said signal processing apparatus in time sequence with the reading out and coupling to said output of said signal processing means of said first and second signal components during said first line interval of each of said two-line interval groups; (3) said third signal component to be written into said sixth storage means at said first rate during said second line interval of each of said two-line interval groups; and (4) said third signal component previously written into said fifth storage means to be read out of said fifth storage means at said third rate and to be coupled to said output of said signal processing apparatus in time sequence with the reading out and coupling to said output of said signal processing means of said first and second signal components during said second line interval of each of said two-line interval groups.

15. A television magnetic tape recording apparatus for recording onto magnetic tape first and second color-difference signal components supplied by first and second signal sources, respectively, said first and second signal components both occurring concurrently during each of successive scanning line intervals, said apparatus comprising:
first and second storage means each having an input terminal coupled to said first signal source for, in combination, storing said first signal component of each of said line intervals, each of said first and second storage means also having an output;
third and fourth storage means each having an input terminal coupled to said second source for, in combination, storing said second signal component of each of said line intervals, each of said third and fourth storage means also having an output;
transducing means for recording signals applied thereto onto a single channel of said magnetic tape;
clock means coupled to said first, second, third and fourth storage means for controlling the rates at which said first and second storage means write in and read out said first signal component, and for controlling the rates at which said third and fourth storage means write in and read out said second color-representative signal component;
switch means coupled between output terminals of said first, second, third and fourth storage means and said transducing means for selectively coupling the signals read out from said first, second, third and fourth storage means to said transducing means; and control means coupled to said clock means and to said switch means for repetitively causing, in groups of two-line intervals including first and second line intervals, (1) said first and second signal components to be concurrently written into said first and third storage means, respectively, at a first rate during said first line interval of each of said two-line interval groups; (2) said first and second signal components previously written into said second and fourth storage means, respectively, to be sequentially read from said second and fourth storage means, respectively, at respective rates, greater than said first rate, and to be sequentially coupled by said switch means to said transducing means for sequential recording onto said channel of said magnetic tape during said first line interval of each of said two-line interval groups; (3) said first and second signal components to be concurrently written into said second and fourth storage means, respectively, at said first rate during said second line interval of each of said two-line interval groups; and (4) said first and second signal components previously written into said first and third storage means, respectively, to be sequentially read from said first and third storage means, respectively, at said respective second rates and to be sequentially coupled by said switch means to said transducing means for sequential recording onto said channel of said magnetic tape during said second line interval of each of said two-line interval groups.

16. A television magnetic tape recording apparatus for recording onto magnetic tape luminance-representative signal components supplied by a first signal source and color-representative R-Y and B-Y signal components supplied by second and third signal sources, respectively, said luminance-representative, R-Y and B-Y signal components all occurring concurrently during each of successive scanning line intervals, said apparatus comprising:

first transducing means coupled to said first signal source for recording said luminance-representative components onto a single first channel of said magnetic tape;

first and second storage means each including an input terminal and an output terminal, said input terminals of said first and second storage means being continuously coupled in parallel to said second signal source for, in combination, storing said R-Y signal components of each of said line intervals;

third and fourth storage means, each including an input terminal and an output terminal, said input terminal of said third and fourth storage means being continuously coupled in parallel to said third source for, in combination, storing said B-Y signal components of each of said line intervals;

second transducing means for recording signals applied thereto onto a single second channel of said magnetic tape;

switch means coupled between output terminals of said first, second, third and fourth storage means and said second transducing means for selectively coupling the signals read out from said first, second, third and fourth storage means to said second transducing means; and clocking and control means coupled to said switch means and to said first, second, third and fourth storage means for controlling the periods in which and the rates at which said R-Y and B-Y signal components are written into and read out of said storage means and coupled to said second transducing means by said switch means, said control means repetitively causing, in groups of two-line intervals including first and second line intervals, (1) said R-Y and B-Y signal components to be concurrently written into said first and third storage means, respectively, at a first rate during said first line interval of each of said two-line groups; (2) said R-Y and B-Y signal components previously written into said second and fourth storage means, respectively, to be sequentially read from said second and fourth storage means, respectively, at a second rate twice said first rate and to be sequentially coupled by said switch means to said second transducing means for sequential recording onto said second channel of said magnetic tape during said first line interval of each of said two-line groups; (3) said R-Y and B-Y signal components to be concurrently written into said second and fourth storage means, respectively, at said first rate during said second line interval of each of said two-line groups; and (4) said R-Y and B-Y signal components previously written into said first and third storage means, respectively, to be sequentially read from said first and third storage means, respectively, at said second rate and to be sequentially coupled by said switch means to said second transducing means for sequential recording onto said second channel of said magnetic tape during said second line interval of each of said two-line groups.

17. In a signal processing system for processing color television signal components including a luminance signal component and first and second color-difference signal components supplied by respective sources, all of said signal components occurring concurrently in each of successive scanning line intervals interspersed with successive line synchronization intervals, apparatus comprising:

a first output;

a first channel for coupling said first and second color-difference signal components from their said respective signal sources to said first output including a first pair of line storage means coupled to said first inputs for storing said first color-difference signal component of each pair of said line intervals, each of said storage means of said first pair of storage means having an input continuously coupled to said source of said first color-difference signal component and also having an output; a second pair of line storage means coupled to said second input for storing said second color-difference signal components of each pair of said line intervals, each of said storage means of said second pair of storage means having an input continuously coupled to said source of said second color-difference signal component and also having an output; clock means for defining the writing rate at which said first and second color-difference signal components are written into said storage means and at least one reading rate greater than said writing rate at which said first and second color-difference signal components are read out of said storage means; switch means coupled between said output of said storage means and said first output; control means coupled to said storage means, to said clock means and to said switch means for, during each line interval, causing ones of said ones of said first and second color-difference signal components which are concurrently occurring during said line interval to be written into respective ones of said storage means of said first and second pairs of storage means and causing ones of said first and second color-difference signal components corresponding to the same line interval which have been stored in the other respective ones of said storage means of said first and second pairs of storage means during a previous line interval to be sequentially read out of said other respective ones of said first and second pairs of said storage means and to be coupled by said switch means to said first output in time-compressed form.

18. The apparatus according to claim 17, further incuding:
   a third input for receiving said luminance signal component;
   a second output;
   a second channel for coupling said luminance signal component from its said signal source to said second output;
   first transducer means coupled to said first output for recording said first and second color-difference signal components on a first track of a magnetic tape; and
   second transducer means coupled to said second-mentioned output for recording said luminance signal component on a second track of said magnetic tape, separate from said first track.

19. Signal processing apparatus comprising:
   a source of television signals organized in time in successive scanning line intervals interspersed between synchronization intervals and having first and second time-compressed signal components occurring sequentially within each of said line intervals which represent types of color information for the same one of said line intervals, said first and second signal components representing the same respective types of color information in each of said line intervals;
   an input for receiving said television signal;
   first and second outputs;
   first and second pairs of storage means coupled to said input for storing said first and second signal components, respectively, of each pair of said successive line intervals;
   clock means for defining the writing rate at which said first and second signal components are written into said storage means and at least one reading rate lesser than said writing rate at which said first and second signals are read out of said storage means; and
   control means coupled to said storage means and to said clock means for causing, during each line interval, ones of said first and second signal components corresponding to the same one of said line intervals to be sequentially written into respective ones of said first and second pairs of storage means and ones of said first and second signal components corresponding to the same one of said line intervals stored in the other respective ones of said first and second pairs of storage means during a previous line interval to be concurrently read out of said respective other ones of said first and second pairs of storage means and to be coupled to respective ones of said first and second output terminals in time expanded form.

20. Apparatus comprising:
   a source of a video signal including first and second color-representative signal components compressed in time and occurring in sequence during each of successive scanning line intervals, said first and second signal components representing the same type of color information in each of said successive line intervals;
   first and second storage means having respective inputs and outputs for storing, in combination, said first signal components of each of said line intervals;
   third and fourth storage means having respective inputs and outputs for storing, in combination, said second signal components of each of said line intervals;
   switch means coupled between said source and said inputs of said first, second, third and fourth storage means;
   first and second outputs of said apparatus;
   first coupling means for continuously coupling said outputs of said first and second storage means to said first output of said apparatus;
   second coupling means for continuously coupling said outputs of said third and fourth storage means to said second output of said apparatus;
   clock means coupled to said first, second, third and fourth storage means for controlling the rates at which said first and second storage means write in and read out said first and second signal components and for controlling the rates at which said third and fourth storage means write in and read out said second signal components; and
   control means coupled to said clock means and said switch means for repetitively causing, in groups of two intervals including first and second line intervals, (1) said first and second signal components to be sequentially coupled to and to be sequentially written into said first and third storage means, respectively, at respective first rates during said first line interval of each of said two-line interval groups; (2) said first and second signal components previously written into said second and fourth storage means, respectively, to be concurrently read out of said second and fourth storage means and concurrently coupled to said first and second outputs of said apparatus, respectively, at a second rate, less than said first rates, during said first interval of each of said two-line interval groups; (3) said first and said signal components to be sequentially coupled to and to be sequentially written into said second and fourth storage means, respectively, at said respective first rates during said second interval of each of said two-line interval groups; and (4) said first and second signal components previously stored in said first and third storage means, respectively, to be concurrently read out of said said first and third storage means, respectively, at said first rate and to be concurrently coupled to said first and second outputs of said apparatus, respectively, during said second interval of each of said two-line interval groups.

* * * * *